006# United States Patent [19]

Barnes

[11] 4,199,888
[45] Apr. 29, 1980

[54] COMBINED SINKER AND FISHING LURE

[76] Inventor: Gary D. Barnes, 611 Hermitage St., San Jose, Calif. 95134

[21] Appl. No.: 895,861

[22] Filed: Apr. 13, 1978

[51] Int. Cl.² .............................. A01K 85/00
[52] U.S. Cl. ................. 43/42.33; 43/42.34; 43/42.45; 43/42.39
[58] Field of Search ................. 43/42.11, 42.32, 42.33, 43/42.34, 42.36, 42.39, 42.48, 42.7, 42.45, 43.1, 44.81, 44.87, 44.96, 44.97, 42.5

[56] References Cited

U.S. PATENT DOCUMENTS

| | | | |
|---|---|---|---|
| 1,167,687 | 9/1875 | Pitcher | 43/44.81 |
| 1,848,704 | 3/1932 | Farley | 43/42.36 |
| 1,897,291 | 2/1933 | Andrews | 43/43.1 |
| 2,163,666 | 6/1939 | Carter et al. | 43/42.36 |
| 2,657,495 | 11/1953 | Eppinger | 43/42.34 |
| 2,875,543 | 3/1959 | Sylvester et al. | 428/30 |
| 3,264,775 | 8/1966 | Nahigian | 43/42.39 |
| 3,413,750 | 12/1968 | Henry | 43/42.33 |
| 3,641,698 | 2/1972 | Varaney | 43/42.48 |
| 3,656,253 | 4/1972 | Gaunt | 43/42.33 |
| 3,942,281 | 3/1976 | Hill | 43/42.39 |

FOREIGN PATENT DOCUMENTS

| | | | |
|---|---|---|---|
| 946201 | 5/1949 | France | 43/42.48 |
| 23775 | of 1892 | United Kingdom | 43/44.87 |
| 1379882 | 1/1975 | United Kingdom | 43/42.34 |

OTHER PUBLICATIONS

Chugging Catches Walleyes, R. A. Jenkins, Popular Mechanics, Aug. 1948, p.164.

Primary Examiner—Nicholas P. Godici
Assistant Examiner—K. Bradford Adolphson
Attorney, Agent, or Firm—C. E. Tripp

[57] ABSTRACT

A combined sinker and fishing lure comprises an elongate molded lead body that is substantially half round in cross section along substantially its entire length, has semi-spherical ends, is about 5½" to 6½" long and about ¾" to 1" wide, and weighs about ¾-1 pound. The lure may be longer, say about 8", but its cross section will be correspondingly smaller to provide the desired weight of about ¾-1 pound. A length of twisted wire is embedded along the length of the lead body during molding and has an eyelet at each end for connection to a fishing line at one end and a hook at the other end. The peripheral surface of the body has adhered thereto substantially along its length a reflecting tape comprising an outer transparent layer of plastic film, and intermediate reflective layer of vacuum deposited aluminum and an inner layer of adhesive. The reflective layer is formed with an array of light diffraction figures with each figure having substantially concentric arcuate light diffraction grooves, there being at least 10,000 grooves per diametral inch of each figure for producing an iridescent rainbow play of colors when the sinker is immersed in water that receives sunlight. In one pattern, the array is in the form of a plurality of semi-circular figures that overlap to form a "fish scale" design, the diameter of each figure being about ¼ inches. In another pattern, the figures are formed as an array of fully circular light diffraction figures with a diameter of about one inch.

12 Claims, 11 Drawing Figures

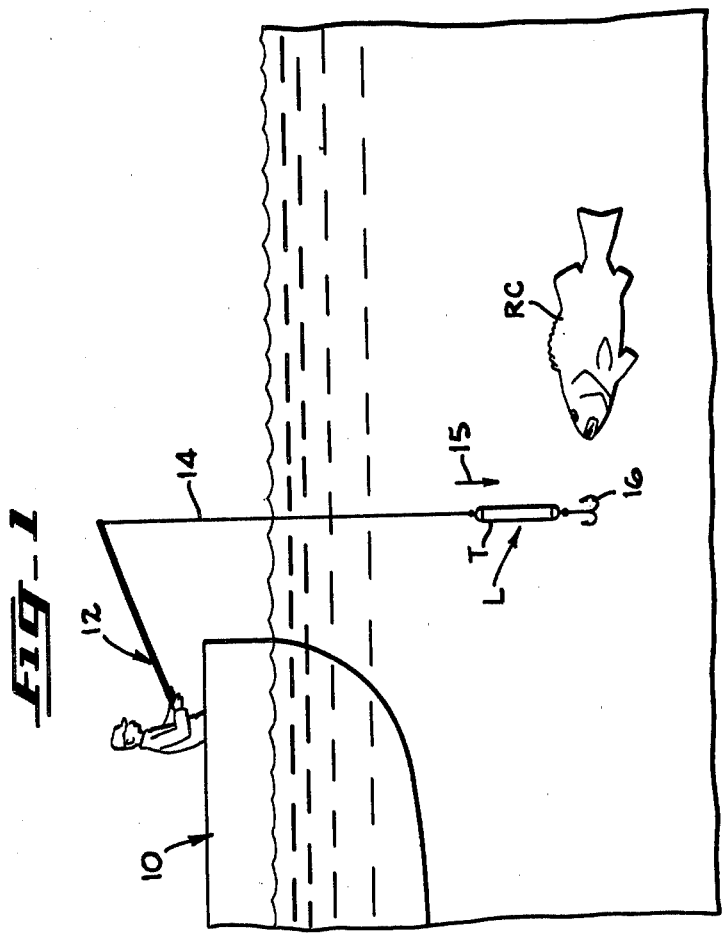
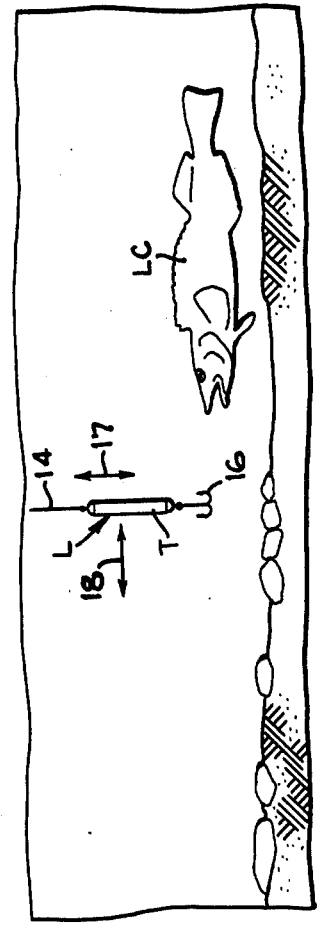
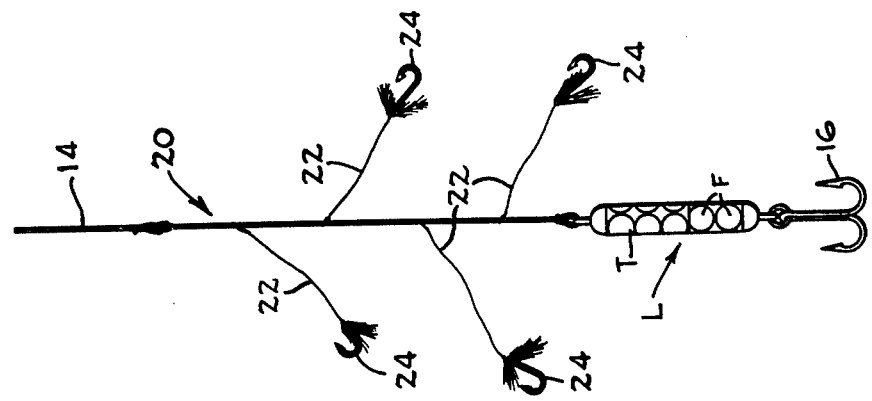

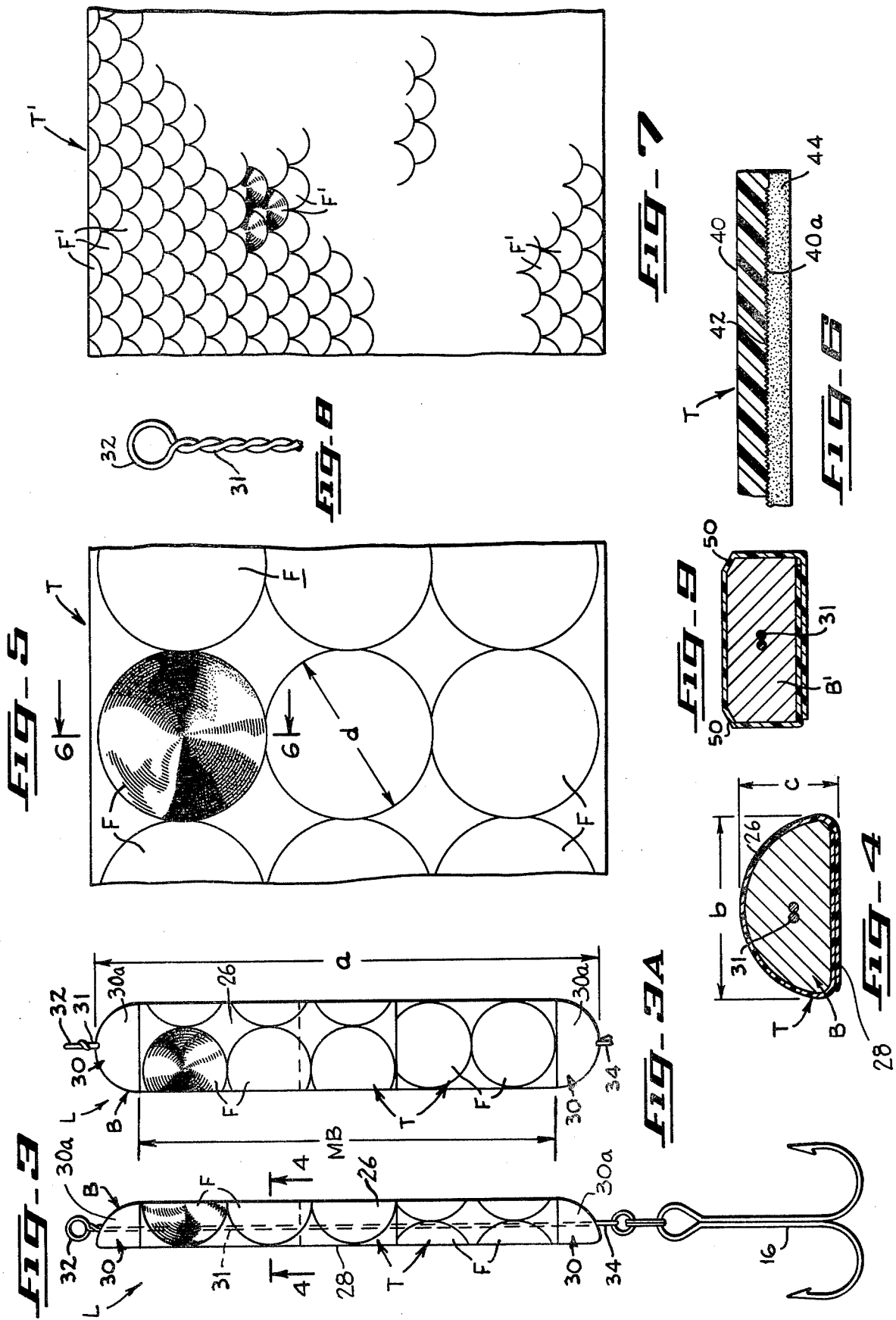

4,199,888

COMBINED SINKER AND FISHING LURE

DESCRIPTION OF THE PRIOR ART

The patent to Sylvester et al, U.S. Pat. No. 2,975,543 Mar. 3, 1959, discloses a sheet of ornamental flexible plastic sheet material formed with a plurality of design regions each having a pattern consisting of a multiplicity of alternate ridges and grooves, with the slopes of the ridge sides varying progressively. Each particular figure has a flat central portion surrounded by the small embossed grooves and ridges. The grooves and ridges are formed on the exterior surface of the sheet.

The patent to Nahigian, U.S. Pat. No. 3,264,775, Aug. 9, 1966 shows a fish lure constructed to effect a wobbling action from side to side after the lure has been cast and is being retrieved by the conventional reel or during trolling. The lure body is made from bronze, or brass or stainless steel and has a flat underside and a convex upper side and the lure is relatively thin, the thickness of the lure relative to its width being such that the convex upper side is approximately a quarter pound. The front and rear edges of the lure are bevelled and the ends are disposed diagonally to the longitudinal axis to form an elongate rhombus. The fish line is connected to one corner of the rhombus and a hook is connected to the diagonally opposite corner. As the lure is moved through the water during retrieval or trolling for causing a wobbling action from side to side and a slight rolling action about its longitudinal axis. There is no mention of using the lure for still fishing.

A second embodiment of the Nahigian fish lure has the same shape as the solid metal embodiment described except that the lure is formed of a plastic elongated body which has a hollowed out cavity filled with lead. The volume of the hollow is only a fraction of the volume of the entire lure.

The patent to Gaunt, U.S. Pat. No. 3,656,253, Apr. 19, 1972, discloses a fishing lure flasher that is moved through the water as by trolling. The lure comprises a base member formed of molded plastic having a thin flat base member with the opposite ends bent diagonally in opposite directions. The flat surfaces of the lure have secured thereto metallic strips extending from end to end formed of either chrome vinyl tape or an aluminum tape such as an adhesive back reflective Mylar. The outer surface of the tape is formed with a "waffle" pattern illustrated in section as having a sinuous outer surface. The spacings of the hills and valleys of the sinuous outer surface of the tape is not described in the specification but appear to be in the order of ⅛" or more in the drawings.

The patent to Varaney U.S. Pat. No. 3,641,698 Feb. 15, 1972, discloses a fishing lure which is drawn through the water as by retrieving following casting, trolling from behind a moving boat or jigging in deep water from an anchored boat or wharf. The lure is made of chrome plated aluminum of magnesium and weighs about 1½ ounces. It has a flat bowed upper surface and a convex keel surface. In the form of FIG. 8, the keel surface at the leading end of the lure is half round and the surface gradually becomes substantially triangular. The depth of the lure in the water is controlled by the speed of retrieval and the lure is intended to provide an undulating, rolling and dragging motion similar to that of a swimming live bait fish. The end of the lure is pierced to receive the eyelet of a dressed jig or hook.

The patent to Henry, U.S. Pat. No. 3,413,750, Dec. 3, 1968, discloses a light diffraction fishing lure of the spoon type which is attached at one end to a leader having a hook thereon. The lure is in the form of a generally circular sandwich made up as a circular shell having one side formed of a thick planished vinyl sheet 0.04 inches thick with no grain and the other side formed of a thinner calendered vinyl sheet 0.012"-0.0125" thick having a grain formed therein. These sheets are heat sealed to enclose a disc of acetate material having an aluminum coating for reflective purposes and formed so as to provide a diffraction grating effect. Since the aluminum coating is readily susceptible to damage it is encased between the aforesaid vinyl sheets. In order to provide a concavo-convex shape to the spoon the assembled parts are heated in an oven to a temperature of about 250° F. causing the calendared sheet to shrink approximately 7% lengthwise in the direction of the grain of the sheet and to expand in the transverse direction providing a concavo-convex shape to the entire sindwich.

Applicant has seen small retrieval type lures shaped as immitation frogs or minnows having narrow bands of reflective tape adhered thereto. The tape had started to peel from the lures even while they are on display at the sporting goods store selling them.

BRIEF SUMMARY OF THE INVENTION

Up to the present time the combined sinker and lure of the present invention has been employed for deep water ocean fishing off the Western Coast of the United States, principally for fish of the Cod family known locally as Blue Bass, Red Snapper, Yellowtail, etc. as well as flounder and mackerel. These fish run in schools at various depths but almost always at a substantial depth. The lure is also effective against a highly sought variety of cod, namely, the Ling Cod which invariably is found on the rocky bottom. The fishing technique is still fishing in that the conventional rig is lowered until it touches bottom and then is raised slightly from the bottom to avoid snagging rocks thereon. The depth of water varies from about 200–400 feet. The conventional rig for such fishing, which almost always is from a boat in order to reach the deep water, employs a hookless ¾ or one pound lead sinker (usually pyramidial or spherical in shape) attached to the bottom of a jig having a plurality of hooks spaced therealong. The hooks may or may not have feathers or other dressing thereon and are almost invariably baited with squidd, anchovies or the like. The lures are not drawn through the water but some motion is imparted thereto by ocean currents, tides or motion of the boat, which occasionally may be permitted to slowly drift. The sinkers must be heavy in order to reach the bottom of the ocean within an acceptable time and to avoid entanglement with the lines of other fishermen on the boat it being understood that a high percentage of such fishing takes place on "party" boats which may carry 20 or more fishermen out into the deep water fishing grounds.

The combined sinker and lure of the present invention is heavy enough to meet the aforesaid requirements of such fishing and may or may not be provided with a hook at its lower end. No bait is required for the hook and if the sinker is attached to the bottom of a jig, and such as a feather jig, no bait need be applied to the hooks on the jig. The combined sinker and lure of the present invention attracts the fish, which take either the hook on the sinker (if present) the hooks on the jigs, or both.

Briefly, the combined sinker and fishing lure of the present invention comprises an elongate molded body preferably about 5½"-6½" long and weighing about ¾-1 pound. The lure may be longer, say about 8" long, so long as it has the aforesaid weight. The body has eyelets at each end, one for connection to a fishing line and the other for connection to a fish hook, if desired. The peripheral surface of the lure body has firmly adhered thereto along a substantial portion of its length, a reflecting tape. The tape comprises a transparent plastic outer layer, a thin, highly reflective metallic intermediate layer and an inner layer of adhesive, firmly bonding the tape to the body. The reflective layer is formed with an array of light diffracting figures with each figure being formed of substantially concentric arcuate light diffraction grooves, there being at least 10,000 grooves per diametral inch of each figure for producing an iridescent rainbow play of colors when immersed in water that receives sunlight.

In the preferred embodiment of the invention, the diffraction grating figures have a circular shape whose boundaries are semi-circular and overlap to form a fish scale pattern. The diameter of each figure is about ¼ inches. Another effective pattern is one wherein the diffraction grating figures are fully circular and substantially contiguous and have a diameter of about one inch. The lead body, in its preferred form has one flat side and a convex semi-circular side and is substantially uniform in dimension along its length. the ends of the body are preferably rounded into a general partially spherical configuration.

In order to provide the necessary strength to the combined sinker and lure the eyelets are integral with a length of wire embedded in the lead body of the lure when the body is cast before attaching the diffraction grating tape.

In the preferred embodiment, two lengths of wire are twisted together to form a twisted strand having eyelets at each end with the twisted strand molded into the lead body. The undulations of the twisted strand cause the wire to be firmly secured to the body. The diffraction grating effect is obtained by wrapping the body with the reflective tape. The tape is a sandwich of three elements. The outer element or layer is a thin sheet of polyester film about 0.002 inches thick which has an embossed figure on the inner side thereof, of spiral diffraction grating grooves, the successive convolutions of which are equidistant and are approximately 7/100,000 of an inch apart. A metal coating of aluminum is vacuum deposited on the embossed side of the tape to a thickness of less than 1/1,000,000 of an inch and the aluminum coating is covered with and protected by a layer of heat resistant pressure-sensitive adhesive, such as an acrylic adhesive. I prefer to apply the tape along substantially the entire length of the lead body and I have found that by baking the assembly in an oven at about 200° F. for 45 minutes to 1 hour the tape is so firmly adhered to the lead body that no rough handling will dislodge it and that although large fish may bite and indent the body and overlying diffraction plastic grating layer, the layer maintains its integrity and adherence to the lead body.

Most fishermen doing still fishing of the type referred to are seeking fish of the Cod variety and particularly the Ling Cod, which is a large long fish that invariably resides among the rocks on the rocky bottom. I have found on a number of occasions that in an attempt to lower the combined sinker and fishing lure of my invention to the bottom in search of Ling Cod, it has passed through schools of other Cod locally known as Red Snappers, Blue Bass, Yellowtail, etc. who have taken the lure as well as the hooks on any jig above the lure before I was able to lower the lure to the bottom.

The Ling Cod, being a large fish, is attracted by large bait and I have found that if I am successful in reaching the bottom, the Ling Cod will take a hook on the bottom of the lure even though it is not baited or will even take hooks on a leader that suspends the combined sinker and lure of my invention. I have had a number of experiences with still water ocean fishing of the type described on party boats or with other fishermen where my combined sinker and lure has caught substantially more fish than were captured by fishermen using the conventional lead sinker and jigs with bait, such as squid, anchovies or the like. I have also caught flounder and sharks with the combined sinker and lure of my present invention. I have had no personal experience, as of this time, with deep water still fishing in the Atlantic but have reason to believe that the combined sinker and lure of the present invention will be just as effective in the Altantic as it has been for me during numerous fishing expeditions off the Pacific Coast. Although the combined sinker and lure is most effective on sunny days, I have found that it outperforms conventional rigs on cloudy days.

BRIEF DESCRIPTION OF THE DRAWINGS

FIG. 1 is a diagram showing a fisherman lowering a combined sinker and lure of the present invention through the water.

FIG. 1A is a diagram showing the lure just off the bottom and attracting a Ling Cod.

FIG. 2 shows the lure attached to the lower end of a leader mounting hooks with feather jigs.

FIG. 3 is a side view of the lure.

FIG. 3A is a front view of the rounded side of the lure.

FIG. 4 is a section taken on line 4—4 of FIG. 3.

FIG. 5 is an enlarged view of a section of tape embodying the diffraction grating figures of the present invention.

FIG. 6 is a section taken on line 6—6 of FIG. 5.

FIG. 7 is a view of a view like FIG. 5 showing a tape having a fish scale pattern.

FIG. 8 is a fragmentary view of the combined twisted wire and eyelet unit molded into the lure body.

FIG. 9 is a section like FIG. 4 of a modified form of lure.

BRIEF DESCRIPTION

Although the primary function of the combined sinker and lure of the present invention is to act as a sinker for deep water fishing and its novel function is that of also providing an effective lure for many varieties of deep water fish, the device of the present invention, in the interest of word economy will often be referred to simply as a "lure," even though it is not primarily a lure as that word is used by fishermen. In the present invention, the lead sinker portion of the lure is made of the size and shape to have adequate weight to sever as a sinker for deep water still fishing, but it is modified to have unusually effective properties as a lure.

Referring to FIG. 1, a fisherman is still fishing off an anchored or slowly drifting boat 10 with a rod and reel 12 and a line 14. The lure L is being lowered into the water as indicated by the arrow 15 and in this case has a hook 16 attached to the lower end thereof. A fish RC of the Cod family generically referred to as "Rod Cod" in the Western Coast of the United States is being attracted by the lure. As will be explained in detail presently, the lure is covered substantially along its length by a diffraction grating reflective tape T. As previously mentioned, on many fishing trips I have been unable to lower the lure to the bottom before it was attracted and taken by higher swimming varieties of Code, such as Blue Bass, Red Snappers, Yellowtails, etc.

In FIG. 1A, the lure L covered with the diffraction tape T has reached the bottom of the ocean without being taken by higher swimming fish, and is attracting a large Ling Cod LC. Even though the lure is used in still fishing, when fishing from a boat in the ocean, some slow motion is imparted thereto by motion of the boat 10 in response to wave action by swinging or drifting of the boat and by possible tides and ocean currents. This motion does not correspond to the lure retrieving motion characteristic of many lures of the prior art but there is usually a vertical motion that is illustrated by the arrow 17 and an attendant slight horizontal motion indicated by the arrow 18. Because the lure is relatively long (about 6 inches) and the diffraction grating tape T thereon has fish attracting properties, the lure is especially attractive to Ling Cod, which favor bait offerings that are larger than the pieces of squid or small anchovies, usually attached to hooks on a leader associated with a hookless heavy lead sinker conventionally employed for this type of fishing. The elongate shape and relatively large size of a sinker prepared in accordance with the present invention is believed to represent an attractively large bait fish to the Ling Cod so that they will take a hook connected to the bottom of the sinker, even though it is not baited.

FIG. 2 shows the lure L of the present invention with a rig intended to capture a plurality of Rock Cod RC (FIG. 1) which usually are found in schools that swim in deep water (e.g. 200 feet or more) but may not be at the ocean floor which is the habitat of Ling Cod. Connected to the usual swivel at the end of the fishing line 14 is a conventional leader indicated generally at 20, which leader has a plurality of longitudinally spaced branch leaders 22, each mounting a hook 24. Preferably the hooks 24 are provided with colored jig feathers or the like but no bait need be fixed on the leader hooks 24. The lure L may have a relatively large three pronged hook attached to its lower end, as shown in FIGS. 1 and 1A, or the hook may be omitted as shown in FIG. 3A.

DETAILED DESCRIPTION OF THE COMBINED SINKER AND LURE

FIGS. 3, 3A and 4 illustrate the preferred shape and construction of a lure embodying the present invention. The lure is formed as an elongate lead body B having a major body portion MB (FIG. 3A) that extends substantially the full length of the lure. The major body portion has a generally semicylindrical sidewall 26 that is substantially fully semicircular in cross-section along its length (FIGS. 3A and 4) and a single opposed, substantially flat sidewall 28 (FIGS. 3 and 4) that intersects the arcuate sidewall 26, and short end portions 30, each of which has one flat sidewall that extends from said major body portion sidewall 28. As can be seen in FIGS. 3 and 4, although the generally semicylindrical sidewall 26 is curved when viewed in cross-section (FIG. 4) it is longitudinally straight along the length of the main body portion MB. In the preferred embodiment the semicircular sidewall 26 merges with short, rounded end surfaces 30a which preferably rounded, quarter-spherical end 30a that intersect the flat sidewall 28 (FIG. 3). Along the length of the body of the lure is a wire 31 having eyelets 32, 34 integral with opposite ends of the wire. One of the eyelets, such as eyelet 32, is formed for direct connection to a fishing line as in FIGS. 1 and 1A or to a hooked leader as in FIG. 2. The other eyelet 34 may or may not be connected to a relatively large three pronged hook 16 as previously mentioned. The lure is wrapped with diffraction grating tape T and in the form shown, the entire length of the lure is covered with tape, except for the quarter-spherical ends 30. The ends 30 are preferably painted some bright color or combination of colors such as red or yellow and I have found that such painting may add to the attractiveness of the lure to the purchaser but when employed in the water the lure is substantially as effective without the painted ends as with them. Details of the tape T will be described presently.

I have found that fish and particularly large fish such as Ling Cod sometimes attack the lure directly, exerting forces which tend to loosen the body from the wire 31. To overcome this problem, I form the wire 31 as a double strand of wire with the strands twisted together as shown in FIG. 8 and forming the eyelets 32 and 34 (not shown) at the ends of the wire.

The body B of the lure is formed by preparing a mold having a half round cavity and laying the wire 31 with its eyelets into the mold. Molten lead is then poured into the mold and when the mold is filled, the major body portion MB has substantially the shape shown in the section of FIG. 4 along its entire length. The ends of the mold cavity are shaped to form the quarter-spherical body ends 30a, previously mentioned.

I have employed two weights of lures; a one pound lure and a ¾ pound lure. Where there are deep currents, when the boat is free and drifting or when fishing on a party boat along with numerous other fishermen, the one pound lure is preferred. Under other conditions, the ¾ pound lure can be employed. By way of example, in the preferred embodiment the one pound lure has a length "a" (FIG. 3A) of about six inches, a width "b" (FIG. 4) of about one inch and a thickness "c" of about 0.550 inches. The ¾ pound lure preferably has a length "a" of about 5⅛ inches, a width "b" of about ⅞" and a thickness "c" of about 0.500 inches. As mentioned, a lure about 8" long can be employed, so long as it has a weight of about ¾-1 pound and if it is of the preferred half round shape along its length, its diameter will be about 0.85 inches.

After the lure is removed from the mold, it is wrapped with diffraction grating tape T and the assembly is heated in an oven or the like at a temperature of about 200° F. for ¾-1 hour, which adheres the tape so firmly to the lure that it cannot be pulled free thereof without the use of a knife to loosen a portion of the tape and a pair of pliers and even under these circumstances, the bond is so strong that the gripped portion of the tape will usually tear away from the remainder of the tape which cannot be peeled off. In the embodiment shown in FIG. 3, the length of tape T wrapped around the body of the lure is of insufficient width to cover the entire length of the lure and hence, two lengths of tape, one overlapping the other are employed. Of course if the tape is wide enough, a single piece will be employed. The tape has diffraction grating figures F, to be described in detail presently, and there is no need that the two lengths of tape be employed mounted on the lure so that these figures are in alignment, although it would be possible but unnecessary to wrap the tape so that they are in alignment.

The Tape

FIG. 5 is an enlarged front or outer view of one form of tape T laid out flat for purposes of illustration and FIG. 6 is a section through the tape taken on line 6—6 of FIG. 5. This form of the tape is provided with an array of diffraction grating figures F which are fully circular and the outer boundaries of which are contiguous. The diameter "d" of the figure F is preferably about one inch.

As seen in the section of FIG. 6, the outer layer 40 of the tape is formed of a tough plastic film such as a strong polyester film and the tape is so tough and resistant to abrasion that its thickness need be only about 0.002 inches. The tape is clear, which in conjunction with the fact that it is thin, makes it highly transparent. During manufacture of the tape, the figures F are formed on the inner side of the tape by embossing it with a master die (not shown) having a continuous spiral groove forming convolutions 40a having alternate ridges and indentations. The individual convolutions of the ridges and indentations are spaced equi-distant and they are, in the preferred embodiment, only 7/100,000 of an inch apart. The individual indentations or convolutions 40a shown in FIG. 6 would not be visible on the enlarged scale of that view and they are scarcely visible under a 120 power microscope. The embossed tape 40 is placed in a conventional metallizing vacuum chamber and a thin coating 42 of highly reflective metal (preferably aluminum) is vacuum deposited over the convolutions 40a. The thickness of the metal deposit is only about one millionth of an inch but this is sufficient to provide an iridescent rainbow pattern of colors even when the tape is immersed in water to a depth as great as 400 feet, providing sunlight reaches the lure. In order to protect the microscopically thin aluminum layer 42 it is covered with a layer 44 of pressure-sensitive or contact adhesive. Preferably this adhesive has an acrylic base so that it will withstand the baking process employed to firmly adhere the tape to the body B of the lure.

Tape of the type described suitable for utilization on the body of my lure is available from the Diffraction Company, Inc. of Riderwood, Md. and is sold as "Iridescent Diffraction Grating Foil (IDF)." The product is manufactured under one or more of U.S. Pat. Nos. 3,463,118; 3,515,459; 3,516,730 or 3,567,561 where applicable.

After the lure bodies have been cast with the leader wires 31 embedded therein, the body is wrapped with one or more lengths of tape T which may overlap at one side, such as at a corner of the flat side thereof as shown in FIG. 4. The amount of overlap is immaterial, the overlap merely being present to avoid the need for neatly matching the free ends of the tape. The completely assembled lure is now placed in an oven or other heat source and baked at about 200° F. for ¾-1 hour which firmly bonds the tape to the lure body B, as previously described. The plastic layer 40 and the adhesive layer 42 will withstand the aforesaid temperature without damage and without deterioration in the quality of the iridescent rainbow pattern of colors produced by the tape.

FIG. 7 is a view like FIG. 5 showing a tape T' formed with a modified but preferred pattern or array of diffraction grating figures F'. The pattern of FIG. 7 can be characterized as a "fish scale" pattern and is formed so that the boundaries of the figures are semi-circular and overlap to form the pattern. In the pattern of FIG. 6 the diameter of the boundaries of the circular portions of the Figure F' are about ¼ inch, although this diameter is not critical, it merely represents a pattern which has been tested and found highly effective. It is contemplated that a fish scale pattern or a similar pattern having larger or smaller diameter figures could be employed.

MODIFIED BODY FORM

FIG. 9 illustrates a cross section like that of FIG. 4 of a modified form of body B' for the lure. As before, the body B' is formed of lead and has embedded therein a strand of wire 31 carrying eyelets at each end. The body is wrapped with a diffraction grating tape T or T' like that previously described. The difference between the lure of FIG. 9 and that of FIGS. 3, 3A and 4 is in the cross sectional shape of the lure and the shape of its ends. In the lure of FIG. 9 the body is generally rectangular along its length and has substantially square ends. One side of the body is slightly beveled along its length at 50. Experience with the lure of FIG. 9 has shown that it is not as effective in attracting Rock and Ling Cod as is the preferred body shape of FIGS. 3, 3A and 4. However, I have caught Flounder on the bottom of the ocean employing the lure of FIG. 9.

Having completed a detailed description of my combined sinker and fishing lure it will be seen that by changing the shape of the conventional sinker employed by hundreds of thousands of Rock Cod fishermen on the West Coast for decades and by covering the modified sinker with a diffraction grating tape of the type described, I have provided a combined sinker and fishing lure that is more effective when still fishing for ocean fish such as Rock Cod, Ling Cod, Flounder and similar fish than the rigs now universally employed off the West Coast in this type of fishing. As previously mentioned, although I have not had personal experience with my lure for similar fish off the East Coast, I have no reason to believe it will not be equally effective on that coast.

Although the best mode contemplated for carrying out the present invention has been herein shown and described, it will be apparent that modification and variation may be made without departing from what is regarded to be the subject matter of the invention as defined in the appended claims.

I claim:

1. A combined sinker and fishing lure for deep water fishing, said lure comprising a heavy elongate molded lead body which acts as a sinker, said body having a major body portion having a peripheral surface that extends substantially the full length of the lure and short end portions integral with said major body portion, said major body portion having a substantially semicylindrical sidewall that is substantially fully semicircular in cross-section and a single opposed, substantially flat sidewall that intersects said substantially semicylindrical sidewall, said sidewalls both being longitudinally straight along the length of said major body portion, the cross-sectional shape of said major body portion being of substantially uniform size along its length, said end portions having rounded surfaces that merge with said semicylindrical sidewall and intersect said flat sidewall, eyelets projecting from the end portions of said body, one for connection to a fishing line and the other for connection to a fish hook, said eyelets are formed of a double strand of wire enbedded in the molded lead body and extending along the entire length of the body, said double strand being closely twisted between the eyelets, the peripheral surface of said major body portion having adhered thereto along a substantial portion of its length a reflecting tape, said tape comprising a transparent plastic outer layer, and a thin, highly reflective metallic intermediate layer and an inner layer of adhesive, said reflective layer of the tape being formed with an array of light diffraction figures with each figure being formed of substantially parallel light diffraction grooves, there being at least several thousand grooves per diametral inch of each figure for producing an iridescent rainbow play of colors when immersed in water that receives sunlight.

2. The article of claim 1, wherein the boundaries of light diffraction figures have a circular shape.

3. The article of claim 1, wherein the boundaries of said diffraction figures are semi-circular and overlap to form a fish scale pattern.

4. The article of claim 1, wherein the boundaries of said diffraction figures are fully circular.

5. The article of claim 4, wherein said diffraction figures have a diameter of about one inch and their boundaries are substantially contiguous.

6. The article of claim 1, wherein said reflective metallic layer is bonded to the inner surface of said plastic outer layer and having a thickness of about 1/1,000,000 of an inch.

7. The article of claim 1, wherein said lead body is about 5½ inches to about 6½ inches long, about ¾ inches to about 1 inch wide and weights about ¾ to about one pound.

8. The article of claim 2, wherein said reflective metallic intermediate layer is formed of aluminum about 1/1,000,000 of an inch thick and is bonded to the inner surface of said plastic outer layer.

9. The article of claim 1, wherein the short end portions of said body each have a quarter-spherical surface merging with said generally semicylindrical sidewall and intersecting a flat surface merging with said substantially flat sidewall.

10. The article of claim 1, wherein said tape covers the full length of the major body portion between said end portions.

11. The article of claim 1, wherein said inner layer of adhesive of said reflecting tape is heat bonded to said major body portion of the lure.

12. The article of claim 1, wherein there are at least ten thousand grooves per diametral inch of each diffraction figure.